2,987,931
RATCHET
John P. Adams, 35 Church St., Calais, Maine
Filed July 27, 1959, Ser. No. 832,421
4 Claims. (Cl. 74—143)

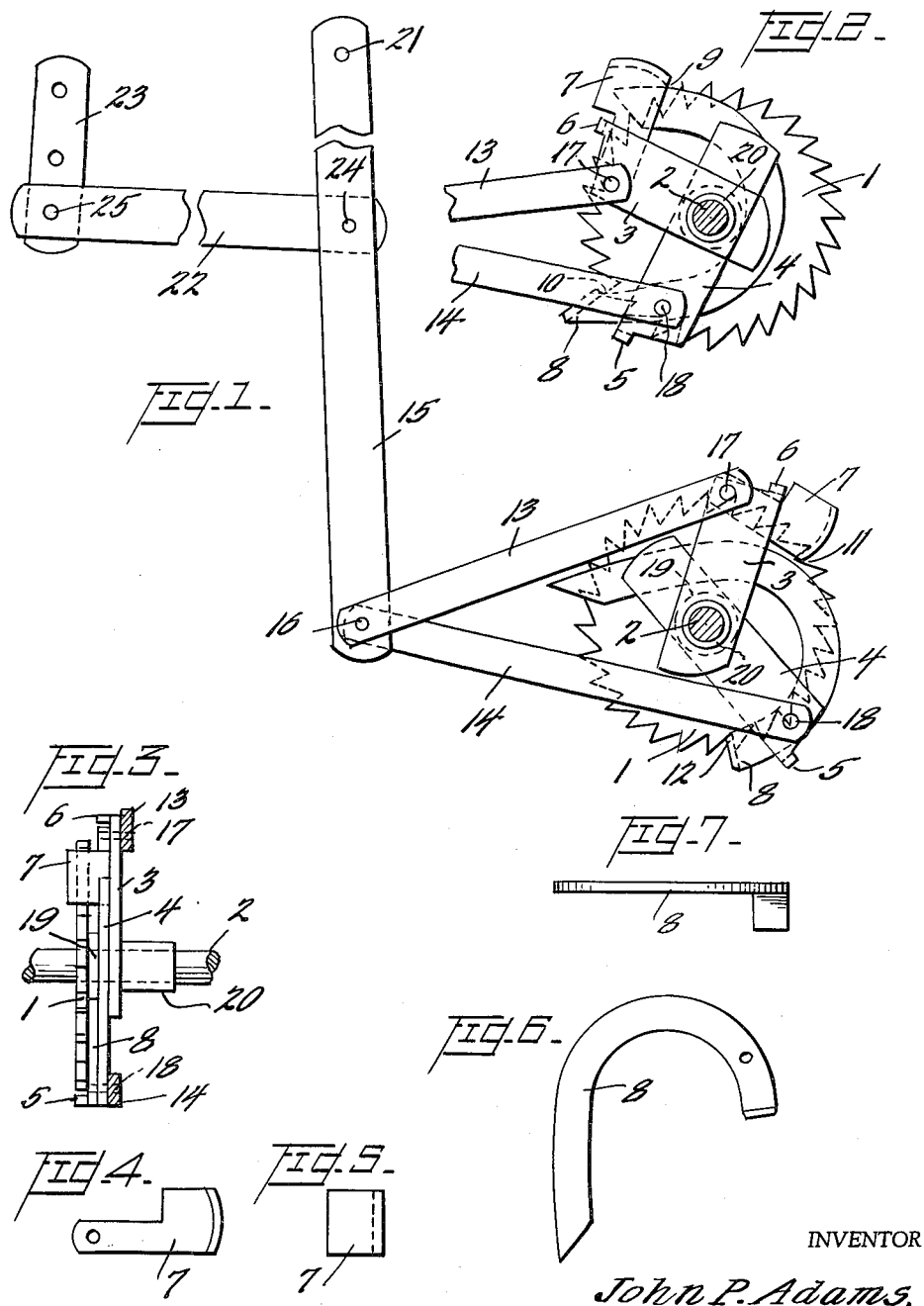

This invention relates to a mechanical mechanism for a figure toy which may be used as a vehicle and exercising device and which is an improvement over my Patent No. 2,226,190, of December 24, 1940.

It is an object of this invention to provide propulsion means in the form of a double ratchet which operates by gravity and counterbalance to avoid spring tension. A further object resides in the provision of a rocker arm so that the ratchet will become disengaged on an extreme forward thrust of the rocking arm to allow a ratchet wheel to turn freely in either direction backward or forward so that the toy will be in free wheeling condition with silent operation.

Further objects will be apparent from the following description when considered in connection with the accompanying drawing in which;

FIGURE 1 is a side view of the driving mechanism with the ratchet mechanism.

FIGURE 2 is a side view of the ratchet mechanism in a position just prior to engagement of a ratchet tooth.

FIGURE 3 is an end view of the ratchet parts position of FIGURE 1.

FIGURE 4 is the side view of a first pawl member.

FIGURE 5 is the end view of the first pawl member.

FIGURE 6 is the side view of a second pawl member.

FIGURE 7 is the end view of a second pawl member.

The mechanism of this invention relates to a ratchet device for propulsion purposes with a toothed ratchet wheel 1 securely fixed on the axle 2. Two rocker arms 3 and 4 are mounted to oscillate on the axle 2 and arm 3 has an ear 6 and arm 4 has an ear 5 to maintain the pawls 7 and 8 in position. In FIG. 2 the pawls 7 and 8 are disengaged in the forward thrust of the ratchet at points 9 and 10. The pawl 7 is disengaged upon sliding on the top of the counterbalance at the point 9 while the pawl 8 is disengaged by its own counterbalance. The pawl 8 is now in position to engage a tooth on the ratchet wheel 1 at the point 10, FIG. 2, to thereby cause the ratchet wheel 1 to rotate counterclockwise.

FIG. 1 shows the backward position with the pawls 7 and 8 engaged at the points 11 and 12, that is the pawl 7 is now in position to engage a tooth on the ratchet wheel to force the wheel 1 to rotate counterclockwise. On the forward movement, FIG. 2, the counterbalance end of the pawl 8 at point 9 moves above the ratchet and lifts pawl 7 free of the ratchet teeth and at the same time the pawl 8 moves forward at the point 10 to disengage pawl 8 from the ratchet wheel 1.

The two connecting arms 13 and 14 are connected to the rocking lever 15 by a bolt 16 at one end and to the arm 3 at rivet 17 and arm 4 at rivet 18 respectively. Pawl 7 is also mounted by rivet 17 on the arm 13 and pawl 8 is mounted on the rivet 18, so that the pawls 7 and 8 are also thus connected to the rocking lever 15. A washer 19, FIG. 3, separates the rocking arm 4 from the ratchet wheel 1 and a guard sleeve 20 maintains the rocking arms 3 and 4 in a working position on the axle 2. The rocking lever 15 is fulcrumed on the toy, not shown at 21 by a suitable bolt or pin. The rocking lever 15 is connected to a head of the toy by an extended link bar 22 and a short crank or lever member 23 is pivotally connected at 25 with the link bar 22 pivotally connected at 24. By moving the head of the toy back and forth as is evident from the Patent No. 2,226,190, the ratchet wheel is caused to be rotated with however the ratchet wheel free from the contact with the pawls 7 and 8 when the head of the toy is in its extreme backward position.

I claim as my invention:

1. A mechanical mechanism particularly for propelling toys and vehicles, comprising a shaft, a toothed ratchet wheel securely mounted on the shaft, a pair of rocker arms rotatably mounted on the shaft and each arm having an ear secured thereon, a pawl pivotally mounted on one of the rocker arms and having a portion adapted to engage the teeth of the ratchet wheel, a pawl pivotally mounted on the other rocker arm and near one contact end with the other end having a curved lifting element adapted to contact the first-mentioned pawl at the end of a power stroke where the pawls will disengage from contact with the teeth of the ratchet wheel, the second-mentioned pawl shifting on its pivot to engage under the first-mentioned pawl by the curved lifting element which is heavier than the first-mentioned end, and means connected to the rocker arms at the pivot points of the pawls and mounted for reciprocating motion to thereby alternately connect and disconnect the pawls from the ratchet wheel.

2. A mechanical mechanism particularly for propelling toys and vehicles, comprising a shaft, a toothed ratchet wheel securely mounted on the shaft, a pair of rocker arms rotatably mounted on the shaft and each arm having an ear secured thereon, a pawl pivotally mounted on one of the rocker arms and having a portion adapted to engage the teeth of the ratchet wheel, a pawl pivotally mounted on the other rocker arm and near one contact end with the other end having a curved lifting element adapted to contact the first-mentioned pawl at the end of a power stroke where the pawls will disengage from contact with the teeth of the ratchet wheel, the second-mentioned pawl shifting on its pivot to engage under the first-mentioned pawl by the curved lifting element which is heavier than the first-mentioned end, and means connected to the rocker arms at the pivot points of the pawls and mounted for reciprocating motion to thereby alternately connect and disconnect the pawls from the ratchet wheel, said means including a pair of operating arms each pivoted at one end to the respective rocker arm and the other end pivotally connected to each other, and a rocking lever pivotally mounted in the toy and pivotally connected to the operating arms at the common pivotal connection.

3. A mechanical mechanism according to claim 1, in which each rocker arm is provided with an ear to maintain the respective pawls in position.

4. A mechanical mechanism according to claim 1, in which the pawls are operative by pivotal connection and are under the influence of gravity by means of the curved lifting element.

References Cited in the file of this patent

UNITED STATES PATENTS

| | | |
|---|---|---|
| 1,590,988 | Campbell | June 29, 1926 |
| 2,875,621 | Peters | Mar. 3, 1959 |